United States Patent [19]
Otsuka

[11] Patent Number: 5,392,340
[45] Date of Patent: Feb. 21, 1995

[54] TELEPHONE EXCHANGE APPARATUS

[75] Inventor: Kuniaki Otsuka, Yokohama, Japan

[73] Assignee: Canon Kabushiki Kaisha, Tokyo, Japan

[21] Appl. No.: 247,417

[22] Filed: May 23, 1994

Related U.S. Application Data

[63] Continuation of Ser. No. 779,824, Oct. 21, 1991, abandoned.

[30] Foreign Application Priority Data

Oct. 22, 1990 [JP] Japan .................................. 2-285252

[51] Int. Cl.[6] .................................. H04M 3/42
[52] U.S. Cl. .................................. 379/201; 379/356; 379/131
[58] Field of Search ............... 379/201, 211, 355, 356, 379/216, 354, 131, 132, 207

[56] References Cited

U.S. PATENT DOCUMENTS

| | | | |
|---|---|---|---|
| 4,602,128 | 7/1986 | Freundlich | 379/200 |
| 4,680,785 | 7/1987 | Akiyama et al. | 379/57 |
| 4,833,705 | 5/1989 | Kobayashi | 379/355 |
| 4,896,346 | 1/1990 | Belfield et al. | 379/88 |
| 4,899,373 | 2/1990 | Lee et al. | 379/207 |

FOREIGN PATENT DOCUMENTS

| | | | |
|---|---|---|---|
| WO8603359 | 6/1986 | European Pat. Off. . | |
| 3531867 | 3/1987 | Germany . | |
| 58-187057 | 11/1983 | Japan . | |
| 1-119196 | 5/1989 | Japan | 379/355 |
| 1-173994 | 7/1989 | Japan | 379/355 |
| 1-205653 | 8/1989 | Japan | 379/355 |
| 1-236848 | 9/1989 | Japan | 379/355 |
| 1-256257 | 10/1989 | Japan | 379/355 |
| 1-303844 | 12/1989 | Japan | 379/355 |

*Primary Examiner*—James L. Dwyer
*Assistant Examiner*—Ahmad F. Matar
*Attorney, Agent, or Firm*—Fitzpatrick, Cella, Harper & Scinto

[57] ABSTRACT

A telephone exchange apparatus for plural extension telephone units is capable of interchanging, in response to a predetermined operation from one of the extension telephone units the extension numbers of two extension telephone units and the associated information stored in advance for these extension telephone units, such as individual one-touch dialling data, abbreviated dialling data and re-dialling data. In response to the predetermined operation, the exchange apparatus interchanges the data areas in a memory respectively corresponding to the physical addresses of the extension telephone units.

22 Claims, 16 Drawing Sheets

FIG. 2

Extension 1 Individual Information (6)

| EXTENSION NUMBER | | 11 |
|---|---|---|
| ONE-TOUCH DIAL DATA | 1 | 123-4567 |
| | 2 | 758-2111 |
| | ... | ... |
| ABBREVIATED DIAL DATA | 10 | 987-6543 |
| | 11 | 654-3210 |
| | ... | ... |
| EXTERNAL LINE RECEPTION RINGING DESIGNATION DATA | 21 | ABSENCE |
| | 22 | ABSENCE |
| | ... | ... |
| RE-DIAL DATA | | 456-7890 |

Extension 2 Individual Information (7)

| EXTENSION NUMBER | | 12 |
|---|---|---|
| ONE-TOUCH DIAL DATA | 1 | 222-3333 |
| | 2 | 444-5555 |
| | ... | ... |
| ABBREVIATED DIAL DATA | 10 | 666-7777 |
| | 11 | 888-9999 |
| | ... | ... |
| EXTERNAL LINE RECEPTION RINGING DESIGNATION DATA | 21 | PRESENCE |
| | 22 | ABSENCE |
| | ... | ... |
| RE-DIAL DATA | | 777-8888 |

⇧

Extension 2 Individual Information (8)

| EXTENSION NUMBER | | 11 |
|---|---|---|
| ONE-TOUCH DIAL DATA | 1 | 123-4567 |
| | 2 | 758-2111 |
| | ... | ... |
| ABBREVIATED DIAL DATA | 10 | 987-6543 |
| | 11 | 654-3210 |
| | ... | ... |
| EXTERNAL LINE RECEPTION RINGING DESIGNATION DATA | 21 | ABSENCE |
| | 22 | ABSENCE |
| | ... | ... |
| RE-DIAL DATA | | 456-7890 |

Extension 1 Individual Information (9)

| EXTENSION NUMBER | | 12 |
|---|---|---|
| ONE-TOUCH DIAL DATA | 1 | 222-3333 |
| | 2 | 444-5555 |
| | ... | ... |
| ABBREVIATED DIAL DATA | 10 | 666-7777 |
| | 11 | 888-9999 |
| | ... | ... |
| EXTERNAL LINE RECEPTION RINGING DESIGNATION DATA | 21 | PRESENCE |
| | 22 | ABSENCE |
| | ... | ... |
| RE-DIAL DATA | | 777-8888 |

FIG. 8A

| PHYSICAL ADDRESS | AREA INDICATION INFORMATION |
|---|---|
| 1 | 1000 (H) |
| 2 | 2000 (H) |
| 3 | 3000 (H) |

FIG. 8B

ADDRESS 1000(H)

| EXTENSION NUMBER | | 11 |
|---|---|---|
| ONE-TOUCH DIAL DATA | 1 | 222-3333 |
| | 2 | 444-5555 |
| | ⋮ | |
| PERSONAL ABBREVIATED DIAL DATA | 90 | 666-7777 |
| | 91 | 888-9999 |
| | ⋮ | |
| RE-DIAL DATA | | 234-5678 |
| EXTERNAL LINE RECEPTION RINGING DESIGNATION INFORMATION | EXTERNAL LINE 21 | RINGING |
| | EXTERNAL LINE 22 | NO RINGING |
| | ⋮ | |
| SERVICE CLASS | | |
| FUNCTION BUTTON ALLOCATION INFORMATION | 31 | HOLDING |
| | 32 | SUBSTITUTE RESPONSE |
| | ⋮ | |
| SPEECH CHARGE INFORMATION | BUDGET | ¥ 10000 |
| | ACCUMULATED TOTAL | ¥ 2500 |

⋮

2000(H)

| EXTENSION NUMBER | | 12 |
|---|---|---|
| ONE-TOUCH DIAL DATA | 1 | 987-6543 |
| | 2 | 654-3210 |
| | ⋮ | |
| PERSONAL ABBREVIATED DIAL DATA | 90 | 456-7890 |
| | 91 | 777-8888 |
| | ⋮ | |
| RE-DIAL DATA | | 777-6666 |
| EXTERNAL LINE RECEPTION RINGING DESIGNATION INFORMATION | EXTERNAL LINE 21 | NO RINGING |
| | EXTERNAL LINE 22 | RINGING |
| | ⋮ | |
| SERVICE CLASS | | |
| FUNCTION BUTTON ALLOCATION INFORMATION | 31 | CAMP ON |
| | 32 | SIMULTANEOUS CALL |
| | ⋮ | |
| SPEECH CHAGE INFORMATION | BUDGET | ¥ 3000 |
| | ACCUMULATED TOTAL | ¥ 800 |

FIG. 11

| PHYSICAL ADDRESS | AREA INDICATION INFORMATION |
|---|---|
| 1 | 2000 (H) |
| 2 | 1000 (H) |

FIG. 12A  `CHANGED   12`

FIG. 12B  `CHANGED   11`

FIG. 12C  `14:35 FRI      11`

FIG. 12D  `14:35 FRI      12`

FIG. 12E  `12 BUSY`

FIG. 12F  `13 BUSY`

FIG. 12G  `CHANGED   13`

FIG.17A

| PHYSICAL ADDRESS | AREA INDICATION INFORMATION |
|---|---|
| 1 | 3 0 0 0 (H) |
| 2 | 1 0 0 0 (H) |
| 3 | 2 0 0 0 (H) |

FIG.17B

| PHYSICAL ADDRESS | AREA INDICATION INFORMATION |
|---|---|
| 1 | 2 0 0 0 (H) |
| 2 | 3 0 0 0 (H) |
| 3 | 1 0 0 0 (H) |

FIG.18A  CALL FROM 11

FIG.18B  CALL FROM 12

TELEPHONE EXCHANGE APPARATUS

This application is a continuation of application Ser. No. 07/779,824, filed Oct. 21, 1991, now abandoned.

BACKGROUND OF THE INVENTION

1. Field of the Invention

The present invention relates to a telephone exchange apparatus storing therein information respectively corresponding to plural extension telephone units.

2. Related Background Art

There is already known a telephone exchange apparatus capable of providing call transfer service in which the user enters, when leaving his seat, the extension number of the place where he is moving, whereby the calls to his extension number are automatically transferred to the extension telephone unit of his destination.

There is also known a telephone exchange apparatus capable of registering one-touch dialling data and abbreviated dialling data independently for each extension telephone unit.

There is also known a telephone exchange apparatus capable of calculating telephone charges in cumulative manner for each extension telephone unit.

SUMMARY OF THE INVENTION

An object of the present invention is to provide a telephone exchange apparatus capable of providing novel services.

Another object of the present invention is to improve the operability when the operator moves to another seat.

Still another object of the present invention is to enable the operator to make calls, even with other extension telephone units, with the one-touch dialling data or abbreviated dialling data exclusive to his own extension telephone unit.

Still another object of the present invention is to enable control of telephone charges for each operator even when the operator makes calls at other seats.

Still another object of the present invention is to improve the message service.

Still other objects of the present invention, and the advantages thereof, will become fully apparent from the following description of the embodiments.

BRIEF DESCRIPTION OF THE DRAWINGS

FIG. 2 is a view showing the structure of a memory for storing individual information in the first embodiment;

FIGS. 8A and 8B are views showing the structure of a memory for storing individual information in the third embodiment;

FIG. 11 is a first view of the memory structure showing correspondence between physical addresses and areas indicating information in the third embodiment;

FIGS. 12A to 12G are views showing states of display in the third embodiment;

FIGS. 17A and 17B are views of the memory structure showing correspondence between physical addresses and area indicating information in the third embodiment; and FIGS. 18A and 18B are views showing states of display of the third embodiment in the message service operation.

DETAILED DESCRIPTION OF THE PREFERRED EMBODIMENTS

Figure 1:
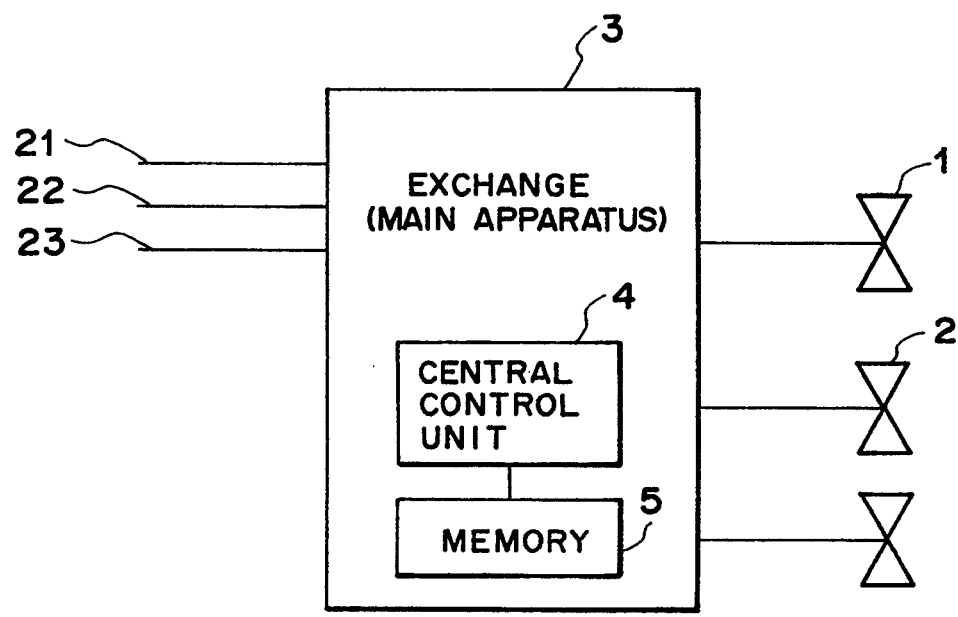
FIG. 1 is a block diagram of a first embodiment of the present invention.

FIG. 1 is a block diagram of a first embodiment of the present invention.

In FIG. 1 there are shown extension telephone units 1, 2; and an exchange (main) apparatus 3 provided with a central control unit 4 and a memory 5. FIG. 2 is a view showing the structure of a memory 5 for storing individual information of the extension telephone units 1, 2. In FIG. 2 there are shown individual information data 6, 7 respectively for the extension telephone units 1, 2. As shown in FIG. 2, extension numbers "11" and "12" are respectively allotted to the telephone units 1, 2.

Figure 3:
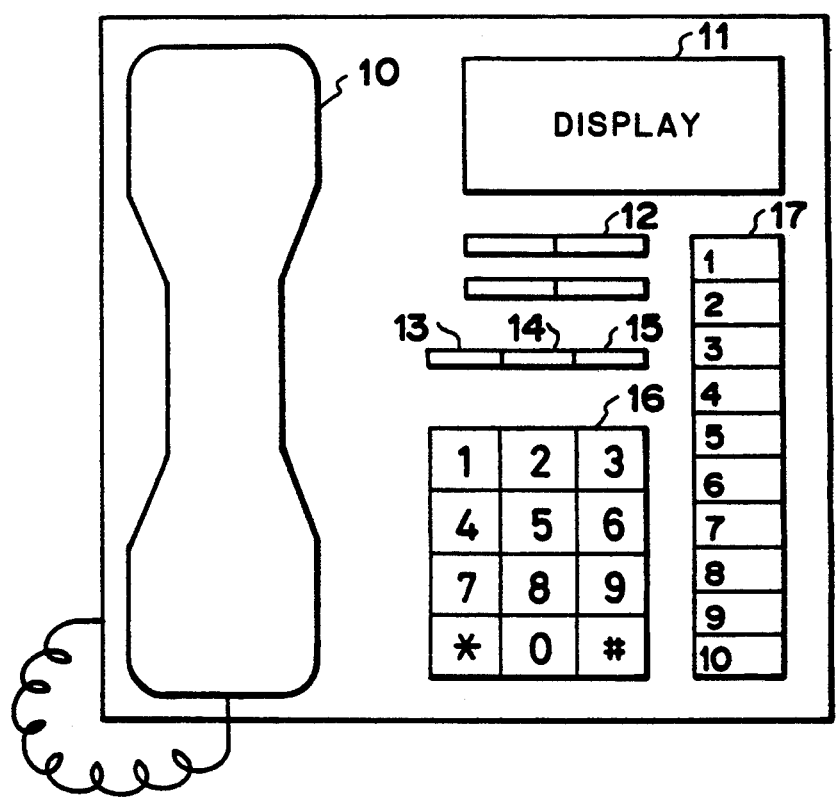
FIG. 3 is an external view of the apparatus of the first embodiment.

FIG. 3 is an external view of the extension telephone unit 1 or 2, each provided with a handset 10, a display unit 11, external line buttons 12, a setting button 13, an abbreviation button 14, a redialling button 15, dial line button 16, and one-touch dialling buttons 17.

Now let us consider a situation in which a person (hereinafter called user) who has been using the extension telephone unit 2 in FIG. 1 has moved to the location of the extension telephone unit 1. In such case, the user depresses the setting button 14 of the extension telephone unit 1 and enters the extension number "12" by the dialling buttons 16, whereupon the central control unit 4 interchanges the individual information 6, 7 for the extension telephone units 1, 2, shown in FIG. 2, into information 8, 9. Thus, if the number "12" is dialled in another telephone unit, the call is received by the extension telephone unit 1 where the user is located. Also the user can use the one-touch dials and abbreviated dialling numbers which are the same as those used in the extension telephone unit 1.

The external call reception ringing designation means whether to ring the bell of the telephone unit 1 or 2 when a call is received from an external line 21 or 22. Before the interchange of the individual data, an incoming call from the line 21 does not ring the extension telephone unit 1 but the unit 2. After said interchange, an incoming call from the line 21 does not ring the unit 2 but the unit 1. Consequently external incoming calls to the user can be promptly responded to.

Also, for example, if the incoming calls from a line 23 are received by the extension telephone unit 2 by DIL (direct in-line) system, such incoming calls after said data interchange are received by the extension telephone unit 1.

When the user returns to the location of the extension telephone unit 2, as he depresses the setting button of said telephone unit 2 and enters the dialling number "12" by the dialling buttons, the telephone unit 2 returns to the extension number "12" while the telephone unit 1 returns to the extension number "11". Thus the state of the individual information 6, 7 shown in FIG. 2 is restored. Also before returning to the location of the extension telephone unit 2, the user may depress the setting button of the telephone unit 1 and enter the number "11", whereby the telephone units 1, 2 respectively return to the extension numbers "11" and "12", thus restoring the state of individual information 6, 7 shown in FIG. 2.

Also if the extension telephone unit 2 is in use when the extension number thereof is entered in the unit 1, said entry operation may be invalidated in order not to disturb the communication currently made with the telephone unit 2.

Figure 4:
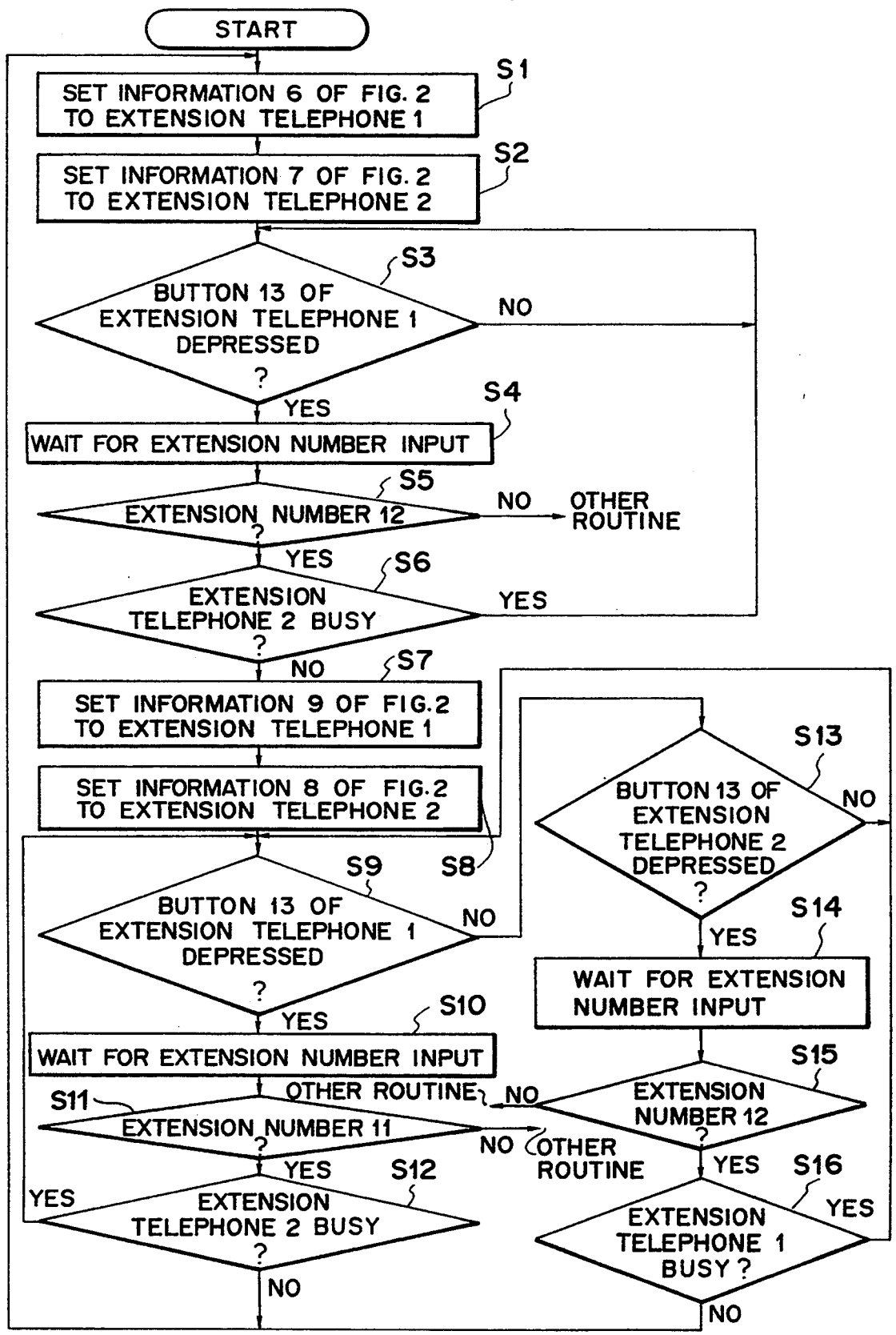
FIG. 4 is a flow chart of the control sequence of the first embodiment.

The above-explained operations are shown in a flow chart of FIG. 4.

At first, the central control unit 4 effects initial setting of the individual information of the extension telephone units 1, 2 (steps S1, S2). Upon detection that the setting button 13 of the telephone unit 1 is depressed (step S3), the central control unit 4 awaits the entry of an extension number from said unit 1 (step S4). When an extension number "12" is entered, the central control unit 4 discriminates whether the extension telephone unit 2, corresponding to the current extension number "12" is in use. If not, the central control unit 5 interchanges the individual information of the telephone units 1, 2 registered in the memory 5 (steps S7, S8).

On the other hand, if the step S6 identifies that the extension telephone unit 2 is in use, said interchange of the individual information is not conducted, in order to prevent that the individual information, such as redialling data, of the telephone unit 2 is unexpectedly changed during use.

After said step S8, the extension telephone unit 1 can make or receive call, based on the individual information 9 shown in FIG. 2.

More specifically, at call reception or at call making from the extension telephone unit 1 or 2, the central control unit 4 controls the outgoing or incoming call according to the individual information 8, 9.

When the setting button 13 is depressed and the extension number "11" is entered by the extension telephone unit 1, and if the extension telephone unit 2 is not in use, the individual information is returned to the initial state (steps S9–S12, S1, S2).

Also when the setting button 13 is depressed and the extension number "12" is entered by the unit 2, and if the unit 1 is not in use, the individual information is returned to the initial state (steps S13–S16, S1, S2).

As explained in the foregoing, in response to a predetermined operation and the entry of the extension number of the unit 2 by way of the unit 1, the individual information of the unit 2 is changed to that of the unit 1, while the individual information of the unit 1 is changed to that of the unit 2.

After this operation, the incoming call to the unit 2 is transferred to the unit 1, while the incoming call to the unit 1 is transferred to the unit 2. Also in case of an outgoing call, the abbreviated dialling numbers and one-touch dialling numbers, which have been used in the unit 2, can be used in the unit 1. Also even if the user does not remember the telephone number previously called from the unit 2, said telephone number can be dialled from the unit 1 by means of the re-dialling function.

Figure 5:
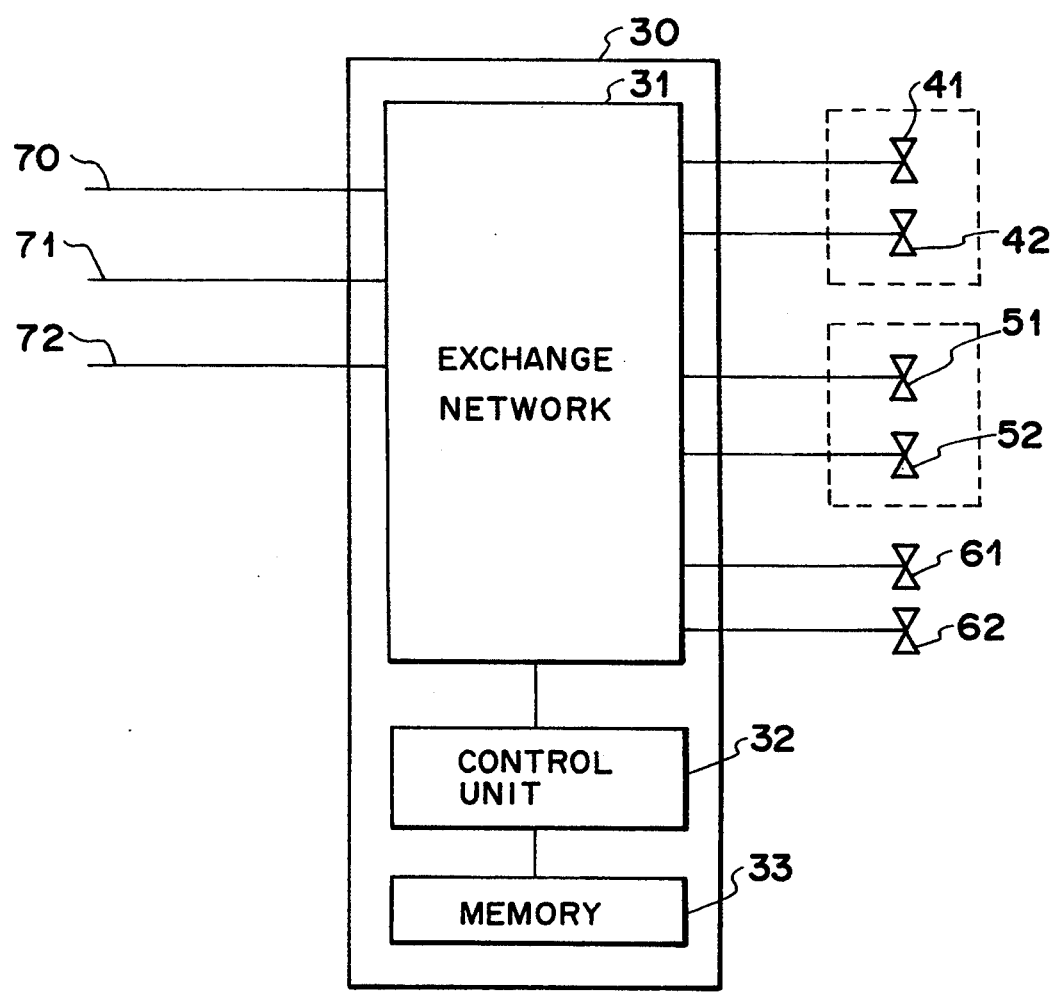
FIG. 5 is a block diagram of a second embodiment.

FIG. 5 is a block diagram of a second embodiment, in which operation data are controlled by the unit of a group of telephone units, and a telephone unit not belonging to said group is controlled by one of the operation data of said group. There are shown an exchange apparatus 30, an exchange network 31, a control unit 32, a memory 33, extension telephone units 41, 42 belonging to a group A, extension telephone units 51, 52 belonging to a group B, extension telephone units 61, 62 not belonging to the group A nor B, and external lines 70–72.

Upon detection, through the exchange network 31, of an incoming call from the external lines 70–72, the control unit 32 refers to the memory 33 and transfers the call to any or all of the extension telephone units. The memory 33 stores data for dial-in or dial-in-line, and also stores extension numbers.

When an extension telephone unit generates a call, the control unit 32 detects the call information from said telephone unit through the exchange network 31. Then the control unit 32 transmits a dialling (DP or PB) signal, by referring to the memory 33 which stores one-touch dialling data and abbreviated dialling data. The telephone units 41, 42 belonging to the group A have common one-touch dialling data etc., while the units 51, 52 belonging to the group B have common one-touch dialling data etc. independently from those of the group A. In this manner, in this embodiment, one-touch dialling data can be registered for each group, according to the state of use thereof.

It is assumed that the telephone units 41, 42 of the group A are placed on the desks of staffs of a section 1, while the units 51, 52 of the group B are placed on the desks of staffs of a section 2, and the units 61, 62 are respectively placed in first and second meeting rooms.

When the staffs of the first section meet in the first meeting room, they can use the extension telephone unit 61 as if it is a telephone unit of said section, by effecting a predetermined operation on the telephone unit 61. Same applies when the staffs of the second section meet in the second meeting room.

When a part of the staffs of the first section moves to the first meeting room, the individual data for call generation for the telephone unit 61 are varied so as to be common with the individual data of the group A, while the incoming calls to the group A are so set as to be received by the telephone units 41, 42.

The individual data of the unit 61 may also be set from the unit 41.

The unit 62 can be used in the same manner as the unit 61.

Figure 6:
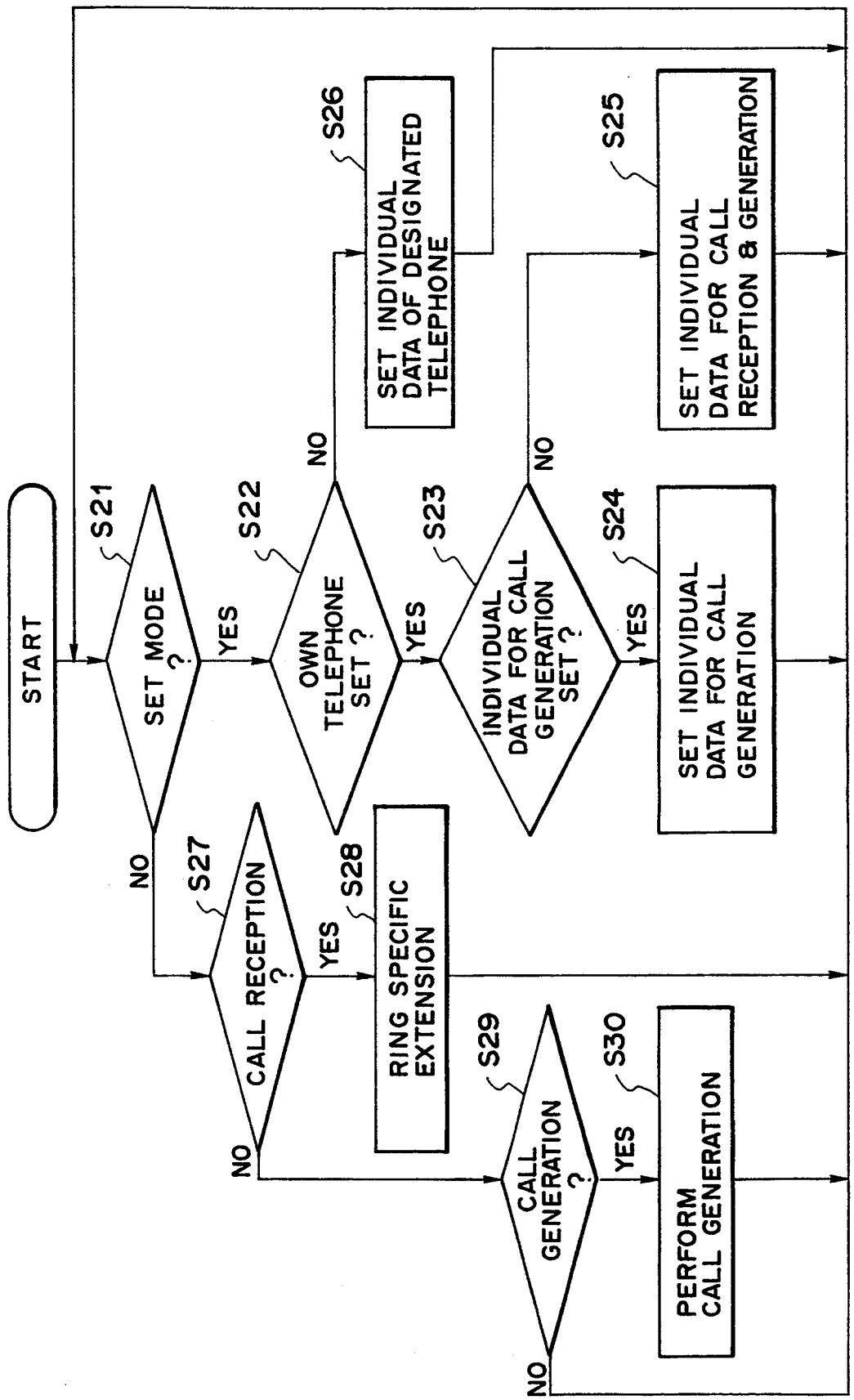
FIG. 6 is a flow chart of the control sequence of the second embodiment.

FIG. 6 is a flow chart of the control sequence 32 of the present embodiment.

With the control unit 32 detects, through the exchange network 31, the entry of a setting mode by key operations of any of the extension telephone units (step S21), said control unit 32 discriminates whether said setting mode is to set to the individual information of the telephone unit through which said entry is made (step S22). Then it discriminates whether said setting is for the individual information for call generation or that for call generation and reception (step S23).

For example, when an instruction is given for setting the individual data for call generation for the group A, by the key operations of the telephone unit 61, the control unit 32 copies the individual data for call generation for the group A, stored in the memory 33, into a registration area of the memory 33, allotted for the individual data for call generation for the extension 61 (step S24). In this case, the control unit 32 leaves the individual data for call reception for the extension 61 as blank. Otherwise, the individual data for call reception may be retained without change.

Also if an instruction is given for setting the individual data for call generation and reception for the group B by the key operation of the extension 62, the control unit 32 copies the individual data for call generation and those for call reception, registered for the group B, into the registration areas of the memory 33, allotted for the individual data for call generation and those for call reception of the extension telephone unit 62 (step S25).

On the other hand, if the step S22 identifies the setting of individual data of another extension telephone unit, the control unit 32 sets the individual data of such another extension telephone unit designated by the key operations (step S26). Thus, for example, the individual data of the extension 61 can be set from the extension 41.

When a call reception from one of the external lines 70–72 is detected through the exchange network 31 (step S27), the control unit 32 rings the bell of an extension, by referring to the individual data for call reception (dial-in data etc.) of the memory 33 (step S28). An incoming call from an extension telephone unit is similarly handled.

If above-explained settings have been made in the steps S24 and S25, the incoming call to the group A rings the bell of the extension telephone units 41, 42. Also the incoming call to the group B rings the bell of the extension telephone units 51, 52 and 62.

Also in case of a call generation (step S29) with the settings explained above, a one-touch dialling or an abbreviated dialling from the extension telephone units 41, 42 and 61 are treated by the control unit 32 according to a common table (step S30). A one-touch dialling or an abbreviated dialling from the extension telephone units 51, 52 and 62 are treated by the control unit 32 according to a different table from that for the extensions 41, 42.

Figure 7:
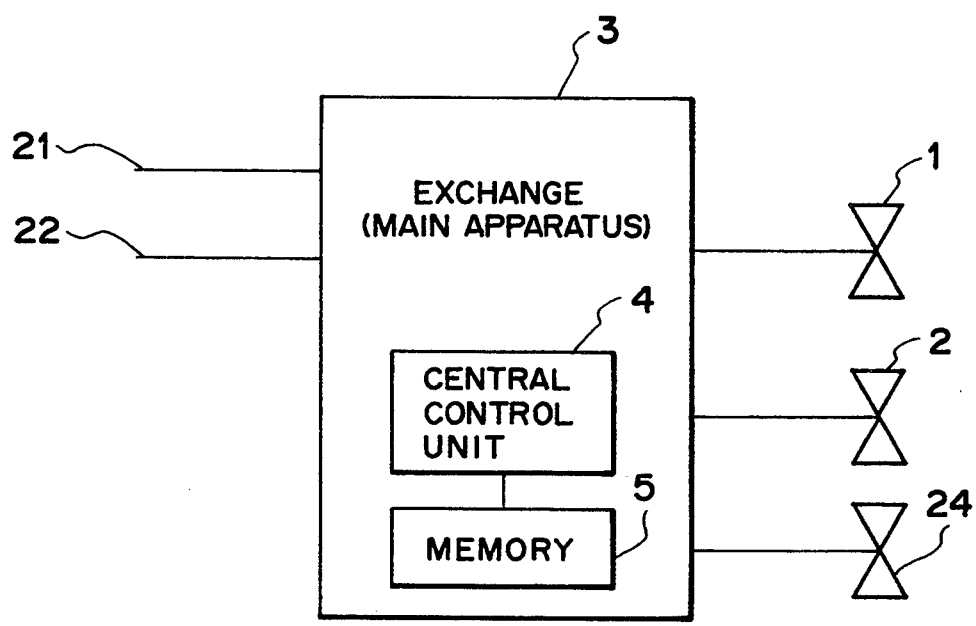
FIG. 7 is a block diagram of a third embodiment.

FIG. 7 shows a third embodiment of the present invention, wherein shown are extension telephone units 1, 2, 24; an exchange or a main apparatus 3 provided with a central control unit 4 and a memory 5; and external lines 21, 22. FIGS. 8A and 8B show the structure of the memory 5, illustrating the information of the extensions 1 and 2, and the correspondence thereof with area indication information and physical addresses. The physical addresses mean the addresses representing the positional relationship of connections of the extension telephone units 1, 2 and 24 with the main apparatus 3. In the example shown in FIG. 7, the physical addresses of the extension telephone units are respectively taken as "1", "2" and "3". The area indication information means address in the memory 5, for data set for each extension telephone unit such as extension number, one-touch dialling data, personal abbreviated dialling data, re-dialling data, incoming call ringing designation information, service class, function button allocation information, telephone charge information etc. FIG. 8A indicates that the data for the extension telephone unit of the physical address 1, namely the extension 1, are stored starting from an address 1000(H) in the memory 5, and those for the extension 2 are stored starting from an address 2000(H).

Figure 9:
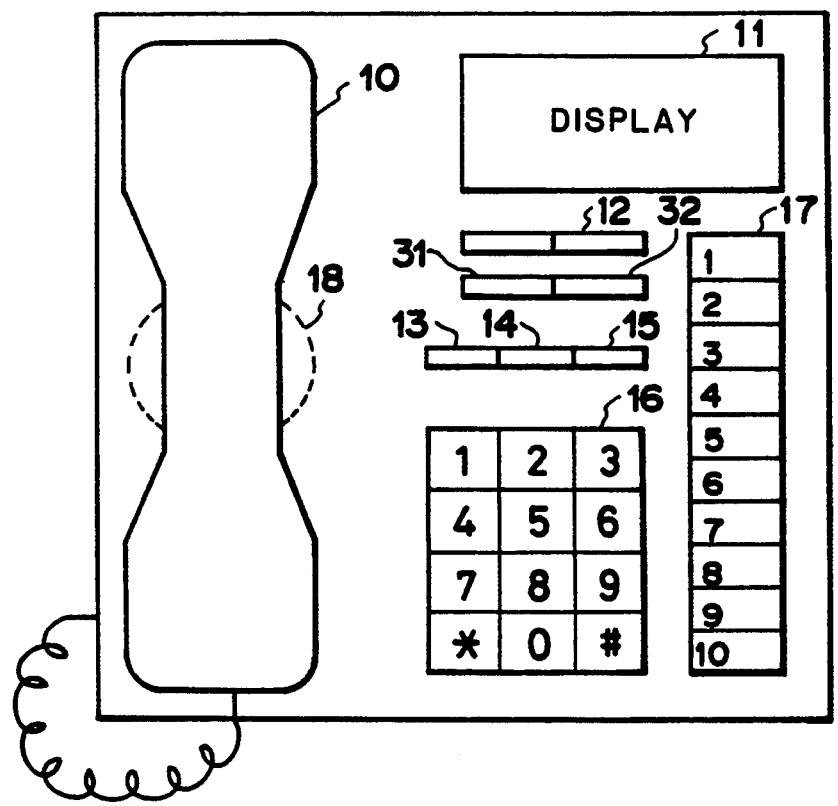
FIG. 9 is an external view of an extension telephone unit in the third embodiment.

FIG. 9 is an external view of the extension telephone unit 1, 2 or 24, wherein provided are a handset 10; a liquid crystal display unit 11; external line buttons 12; an abbreviated dialling button 13; a redial button 14; a registration button 15 for registering one-touch dialling numbers etc.; dialling buttons 16 consisting of "1", "2", "3", "4", "5", "6", "7", "8", "9", "*", "0" and "#"; and one-touch dialling buttons 17. For example, the operator depresses one of the external line buttons 12 to fetch an external line 21, then confirms the tone signal released by an unrepresented exchange apparatus connected to the external line 21 by monitoring with a speaker 18, and depresses one of the one-touch dialling buttons 17 whereby a pre-registered telephone number, for example "222-3333" is sent as a selection signal from the main apparatus 3 to said represented exchange apparatus. Function buttons 31, 32 can be assigned for arbitrary functions specific for each extension telephone unit. As an example, a line holding function can be assigned to the function button 31 by depressing the registration button 15 and then the function button 31, entering a predetermined code corresponding to the line holding function with the dialling buttons 16 and again depressing the registration button 15.

With regards to the abbreviated dialling, the main apparatus 3 has common abbreviated dial data and personal abbreviated dial data. Said common abbreviated dial data can be used by any of the extension telephone units while said personal abbreviated dial data are registered by each extension telephone unit. The re-dialling data are the dialling data most recently made by each extension telephone unit. After depressing one of the external line buttons 12 and confirming the signal tone from the speaker 18, the operator depresses the redialling button 14 whereby the dialling data of the most recent call generation are sent as a selection signal from the main apparatus 3 to the external line 21 or 22.

Referring to FIGS. 8A and 8B, the external line reception (incoming call) ringing designation information designates whether or not to ring the bell of each extension telephone unit upon detection of an incoming call on the line 21 or 22. With the settings shown in FIGS. 8A and 8B, an incoming call on the line 21 rings the bell of the extension 1 but does not ring that of the extension 2, and an incoming call on the line 22 rings the bell of the extension 2 but not that of the extension 1.

The service class indicates the restriction on call generation. For example, a class A has no restriction on call generation; a class B excludes international call generation; a class C excludes specified long-distance and international call generation; and a class D excludes long-distance and international call generation.

The function button allocation information is data for indicating the functions to be assigned to the function buttons 31, 32. In the settings shown in FIGS. 8A and 8B, the function buttons 31, 32 of the extension 1 are respectively assigned for line holding and substitute response, while those of the extension 2 are respectively assigned for camp-on and simultaneous calling. Each of these functions will not be explained in detail.

The speech charge information is to total and administer the charges of the external call generations from each extension telephone unit, wherein the budget is a predetermined value, and the accumulated total is the charge for each extension telephone unit, accumulated from a predetermined time to the current time. These data are used for effecting control, for example, or restricting external call generations or giving an alarm display when the accumulated charge exceeds the budget.

Figure 10:
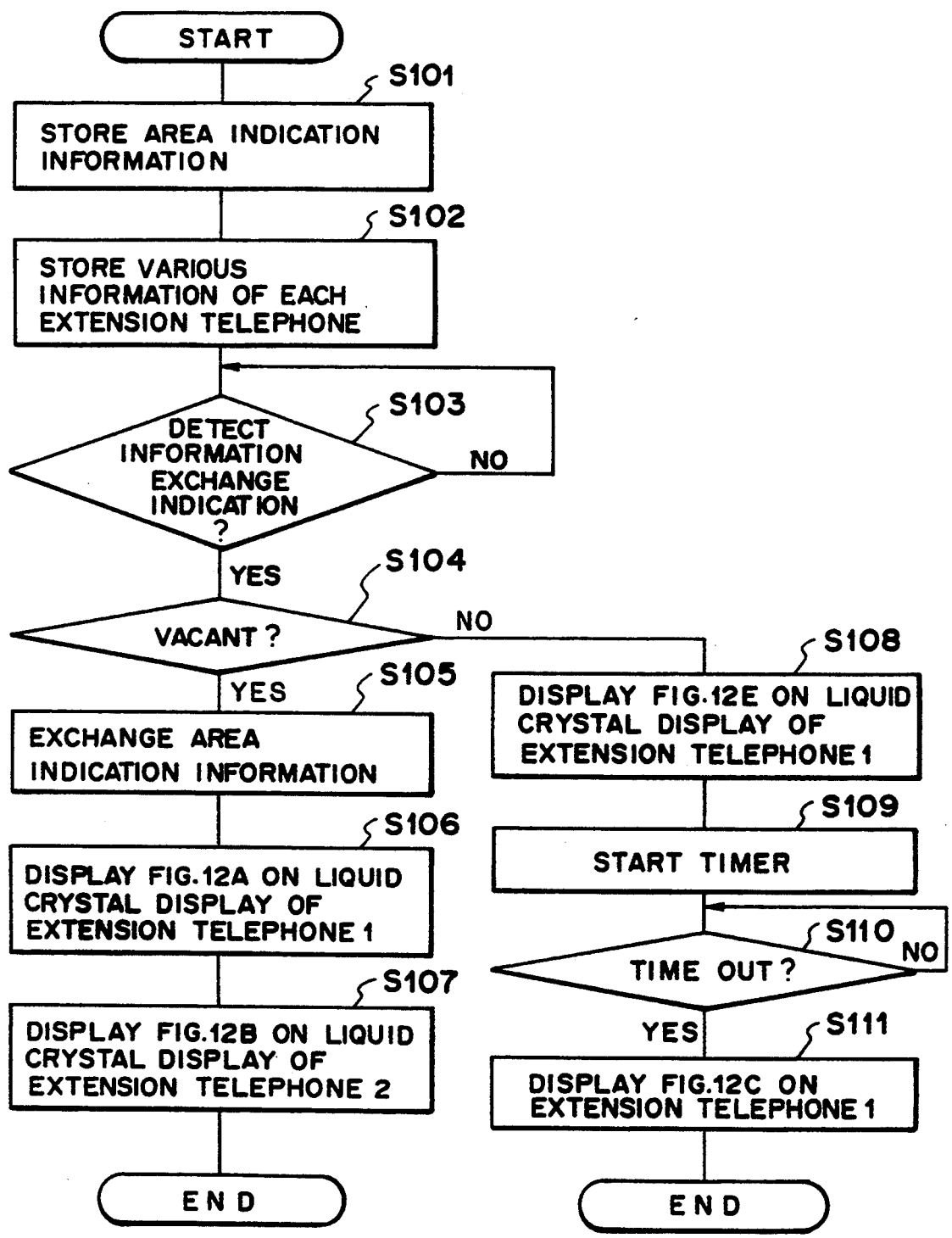
FIG. 10 is a first flow chart showing the control sequence of the third embodiment.

FIG. 10 is a flow chart of the function of the present embodiment.

When the extension telephone units 1, 2 are not busy, the liquid crystal display units 11 thereof indicate time, day of the week and extension numbers as respectively shown in FIGS. 12C and 12D. Also the area indication information, for specifying the areas of the memory 5 for storing various information corresponding to the physical addresses of the extension telephone units, are set as shown in FIG. 8A (step S101), and various information of the extension telephone units are stored in the areas according to said area indication information (step S102).

Thus the extension telephone unit with the physical address 1 has an extension number 11; onetouch dialling data 222-3333, 444-5555 etc.; personal abbreviated dialling data 666-7777, 888-9999 etc.; and re-dialling data 234-5678. It rings the bell upon receiving a call on the external line 21, has a service class A, and allocates the function buttons 31, 32 respectively for "line holding" and "substitute response". The speech charges have been accumulated to 2,500 Yen for a budget of 10,000 Yen. On the other hand, the extension telephone unit with the physical address 2 has an extension number 12; one-touch dialling data 987-6543, 654-3210 etc.; personal abbreviated dialling data 456-7890, 777-8888 etc.; and and re-dialling data 777-6666. It rings the bell upon receiving a call on the line 22, has a service class D, and allocates the function buttons 31, 32 respectively to "camp-on" and "simultaneous calling". The speech charges have been accumulated to 800 Yen for a budget of 3,000 Yen.

Upon detecting a certain operation of the extension telephone unit 1, such as the depression of the registration button 15, entry of the extention number "11" by the dialling buttons 16 or entry of the extension "12" by the dialling buttons 16, the central control unit 4 identifies an instruction for interchange of the various information with those of the extension telephone unit 2 (step S103), and discriminates the state of the extension telephone unit 2 (step S104). If it is not busy, the central control unit 4 interchanges the correspondence between the physical address of the extensions 1, 2 and the area indication information, as shown in FIG. 11 (step S105).

In order to inform the users of the extensions 1, 2 of said interchange, the liquid crystal display units 11 of the extensions 1, 2 respectively provide displays as shown in FIGS. 12A and 12B (steps S106 and S107). The display in FIG. 12A indicates that the extension telephone unit 1 has been changed to an extension number "12" (namely the unit 2 in the past) and the display in FIG. 12B indicates that the extension telephone unit 2 has been changed to an extension number "11" (namely the unit 1 in the past). Said interchange may be made easier to understand for users by emitting predetermined alarm sound from the speaker 18 of each extension telephone unit in the steps S106 and S107.

Thus, when the extension 11 is called from the extension telephone unit 24, the central control unit 4 calls the extension telephone unit 2 by referring to the memory 5 (FIGS. 8B and 11), and, when the extension 12 is called by the extension telephone unit 24, the central control unit 4 likewise calls the extension telephone unit 1. Also in case of an incoming call on the line 21, the central control unit 4 rings the bell of the extension telephone unit 2 by referring to the memory 5 (FIGS. 8B and 11), and, in case of an incoming call on the line 22, the central control unit 4 rings the bell of the extension 1. Also the extension telephone unit 1 has the one-touch dialling data 987-6543, 654-3210 etc.; personal abbreviated dialling data 456-7890, 777-8888 etc.; and re-dialling data 777-6666. It also has a service class D; assigns the function buttons 31, 32 respectively for "camp-on" and "simultaneous calling"; and has an accumulated speech charge of 800 Yen, for a budget of 3,000 Yen. Similarly the various information that have been assigned to the extension telephone unit 1 are now available at the extension telephone unit 2. If an external call is generated from the extension telephone unit 11 in this state, the central control unit 4 accumulates the charge for said external call to the charge accumulation area for the address 2000(H).

On the other hand, if the step S104 identifies that the extension telephone unit 2 is busy, namely in the course of call generation, call reception or speech, a display "12 BUSY" as shown in FIG. 12E is given on the extension telephone unit 1, indicating that the extension telephone unit 2 of the current extension number 12 is busy, for a predetermined period (steps S108–S110) and the operation made on the extension telephone unit 1 is invalidated in order to avoid confusion resulting from sudden changes in the extension number and the one-touch dialling data. Thereafter the indication on the extension telephone unit 1 is returned to the state shown in FIG. 12C.

Figure 13:
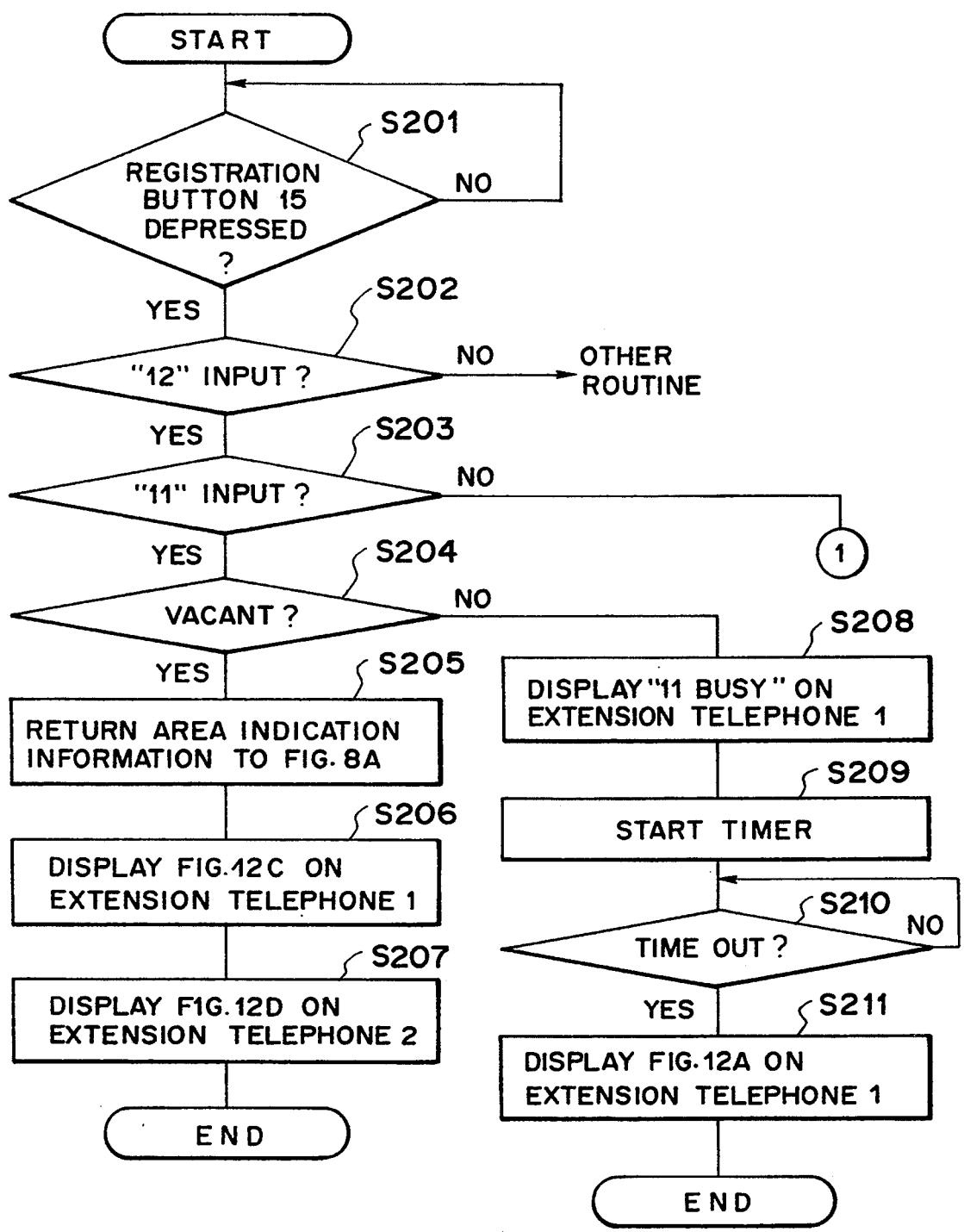
FIG. 13 is a second flow chart showing the control sequence of the third embodiment.
Figure 14:
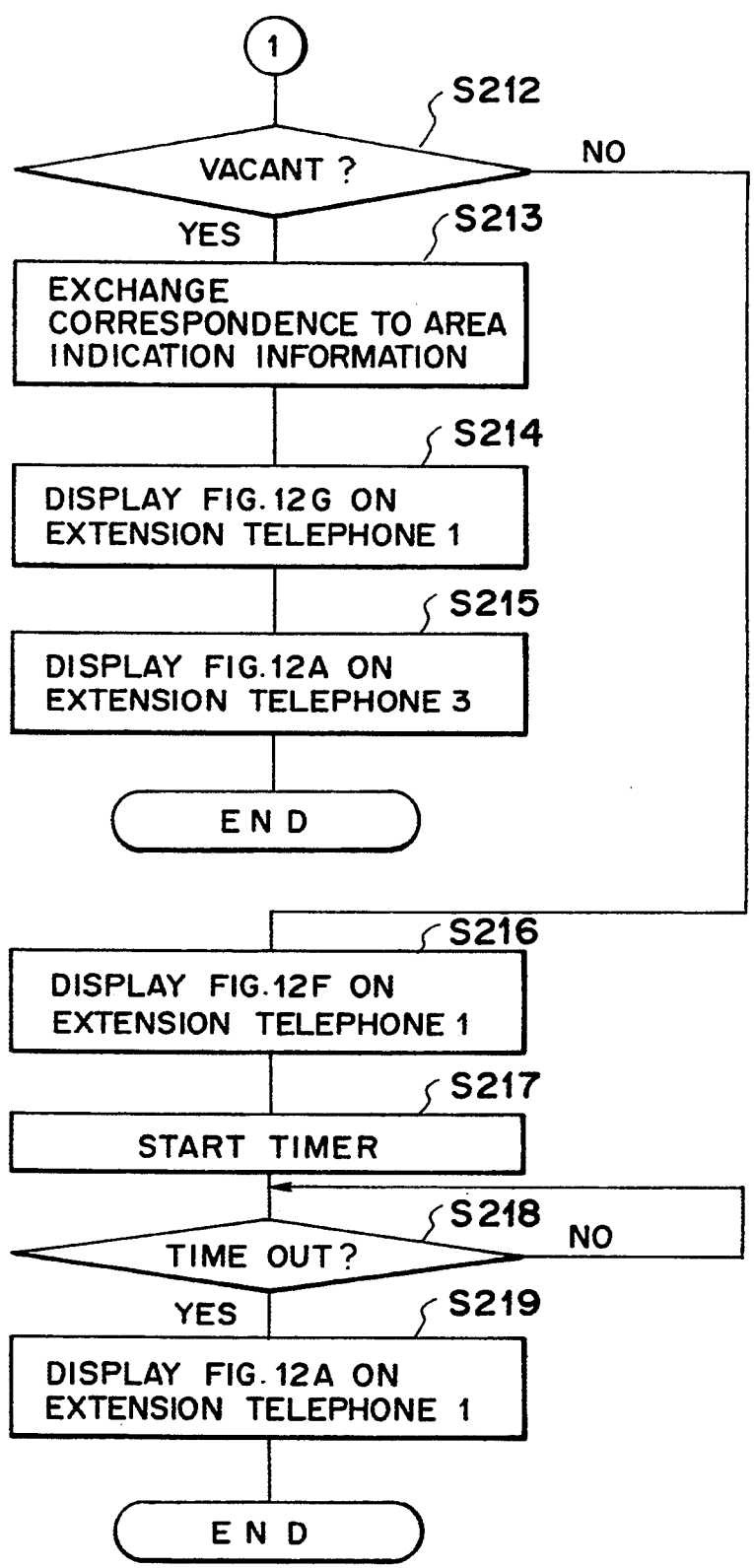
FIG. 14 is a third flow chart showing the control sequence of the third embodiment.

FIGS. 13 and 14 are flow charts showing the sequence of returning the area indication information of the extension telephone units 1, 2 by the operation on the unit 1. It is assumed that the correspondence between the physical addresses and the area indication information of the extension telephone units 1, 2 is inverted as shown in FIG. 11 as the result of execution of the sequence shown in FIG. 10, and that the liquid crystal display units 11 of the extension telephone units 1, 2 respectively provide displays shown in FIGS. 12A and 12B. Thus the extension telephone unit 1 has the extension number 12 and is in a state capable of using information that are originally assigned to the extension telephone unit 2, while the unit 2 has the extension number 11 and is in a state capable of using information that are originally assigned to the unit 1.

In such state, when the operator depresses the registration button 15 of the extension telephone unit 1 (step S201), then enters the extension number "12" of the extension telephone unit 1 by the dial buttons 16 (step S202), and further enters the current extension number "11" of the unit 2 (step S203), the central control unit 4 returns, if the extension telephone unit 2 is not busy (step S204), the correspondence between the physical addresses and the area indication information of the extension telephone units 1, 2 to the state shown in FIG. 8A (step S205). At the same time, displays shown in FIGS. 12C and 12D are respectively given on the liquid crystal display units 11 of the extension telephone units 1, 2.

Thus the extension number of the unit 1 returns to "11", and other information (one-touch dialling data, abbreviated dialling data etc.) originally assigned to the unit 1, as shown in FIGS. 8A and 8B, return to the unit 1. Also the extension number of the unit 2 returns to "12", and other information original assigned to the unit 2 return to the unit 2.

On the other hand, if the step S204 identifies that the extension telephone unit 2 is busy, namely in the course of call generation, call reception or speech, a display "11 BUSY" is given on the extension telephone unit 1, indicating that the extension telephone unit 2 of the current extension number 11 is busy, for a predetermined period (steps S208, S209 and S210) and the operation made on the extension telephone unit 1 is invalidated in order to avoid confusion resulting from sudden changes in the extension number and the one-touch dialling data. Thereafter the indication on the extension telephone unit 1 is returned to the state shown in FIG. 12A.

If the step S202 identifies an operation other than the entry with the dialling buttons 16, for example the depression of a one-touch button 17 or of the abbreviated button 13, there is started a routine for registering the one-touch dialling number or the abbreviated dialling number.

On the other hand, in the step S203, if an extension number other than "11", for example the extension number "13" of the extension telephone unit 24 of the physical address 3, is entered by the dialling buttons 16, the central control unit 4 interchanges, if said extension telephone unit 24 is not busy (step S212), the correspondence of the physical addresses and the area indication information of the extension telephone units 24 as shown in FIG. 17A (step S213). Then the extension telephone unit 1 provides a display "CHANGED 13" as shown in FIG. 12G, thereby clarifying that the extension number has been changed to "13" (step S214), while the extension telephone unit 24 provides a display "CHANGED 12" as shown in FIG. 12A, thereby clarifying that the extension number has been changed to "12" (step S215).

Thus the extension telephone unit 1 can use the information such as one-touch dialling data and abbreviated dialling data, originally assigned for the extension telephone unit 24, as shown in FIG. 8B, and the extension telephone unit 24 can use the data of addresses from 1000(H) to in front of 2000(H).

If the extension telephone unit 24 is busy in the step S212, a display "13 BUSY" as shown in FIG. 12F is given on the extension telephone unit 1 for a predetermined period (steps S216, S217, S218) for the same reason as explained before, and the operation on the extension telephone unit 1 is invalidated. Thereafter said display is returned to the state shown in FIG. 12A (step S219).

On the other hand, if an extension number other than "11" is entered in the step S203, said entry may be rendered invalid in order to avoid confusion resulting from doubled change.

Figure 15:
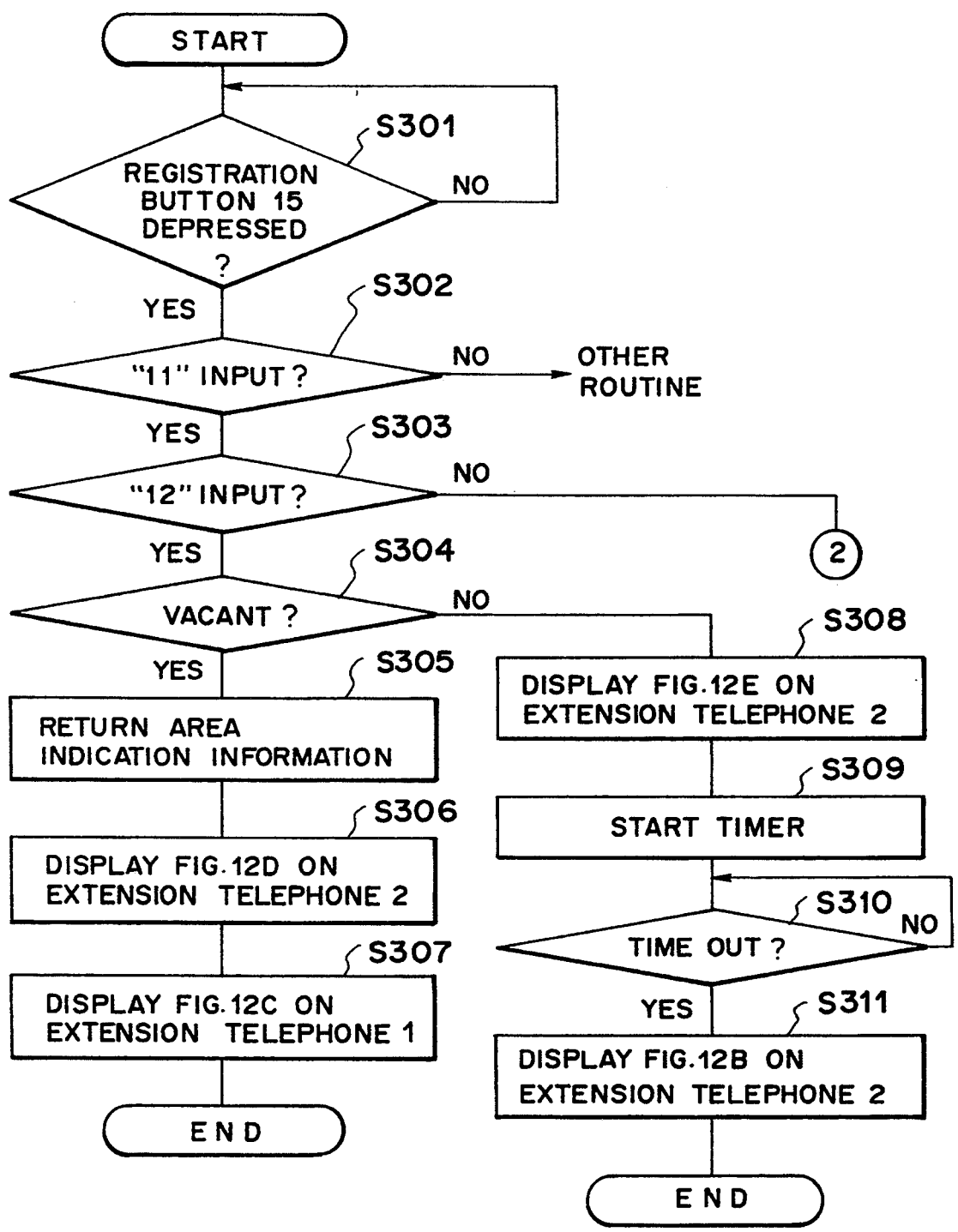
FIG. 15 is a fourth flow chart showing the control sequence of the third embodiment.
Figure 16:
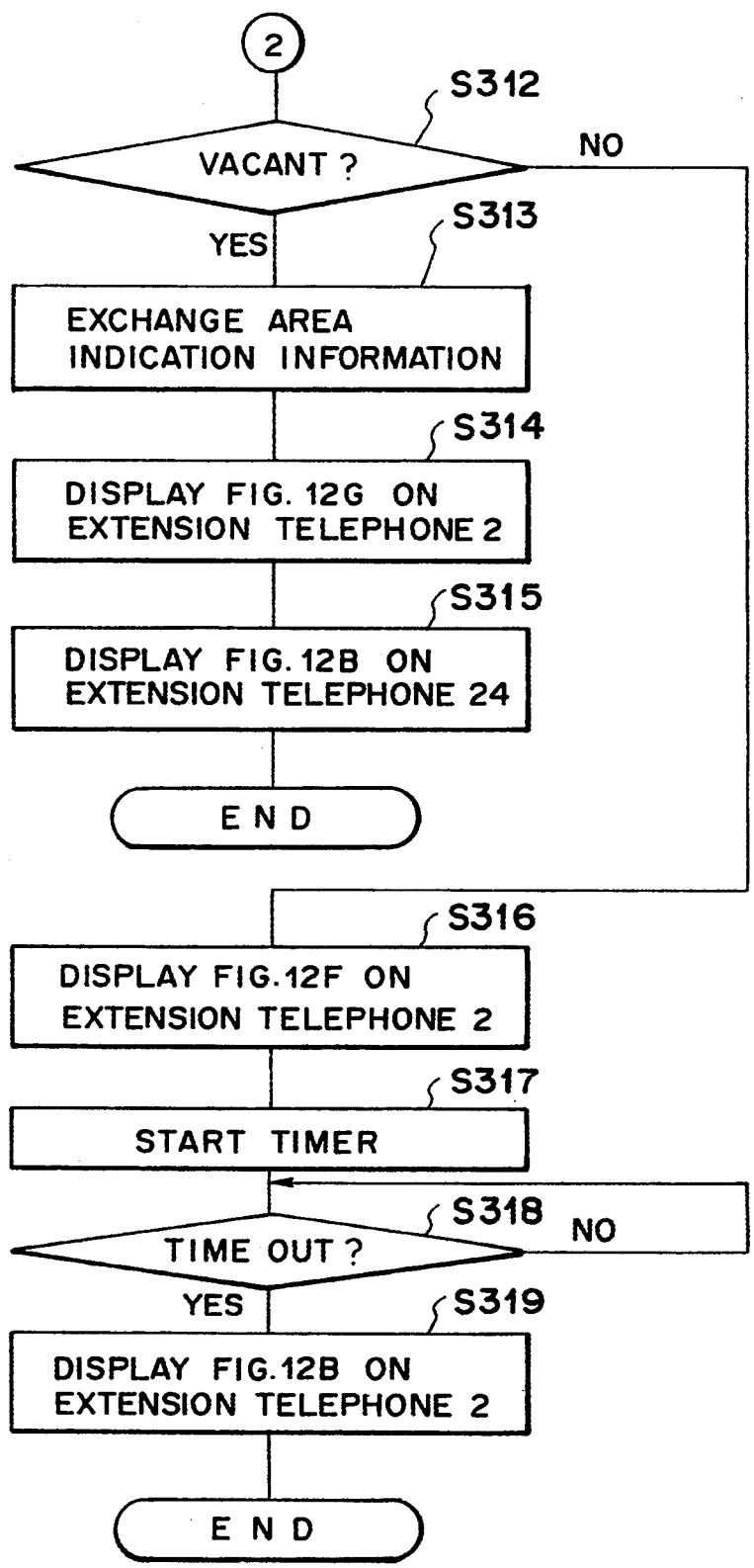
FIG. 16 is a fifth flow chart showing the control sequence of the third embodiment.

FIGS. 15 and 16 are flow charts showing a sequence for returning the correspondence of the physical addresses and the area indication information of the extension telephone units 1, 2, inverted as shown in FIG. 11 with the display of FIG. 12A on the extension telephone unit 1 and that of FIG. 12B on the unit 2, to the state of FIG. 8A by the operations on the extension telephone unit 2.

The operator depresses the registration button 15 of the extension telephone unit 2 (step S301), then enters the current extension number "11" of the extension telephone unit 2 by the dialling buttons 16 (step S302), and the current extension number "12" of the extension 1 (step S303), the central control unit 4 returns, if the extension telephone unit 1 is not busy (step S304), the correspondence between the physical addresses and the area indication information of the extension telephone units 1, 2 to the state shown in FIG. 8A (step S305). Also displays shown in FIGS. 12D and 12C are given respectively on the extension telephone units 2, 1 (steps S306, S307).

Thus the extension telephone unit 1 can use the one-touch dialling data, personal abbreviated dialling data etc. which are originally registered for this unit, and the external line reception ringing designation and the service class return to the original state. Same applies to the extension telephone unit 2. The budget returns to the original state, and the accumulated returns with the charges for the uses while the extension number is changed.

If the extension telephone unit 1 is busy in the step S304, a display "12 BUSY" as shown in FIG. 12E is given for a predetermined period on the extension telephone unit 2, indicating that the extension telephone unit 1 whose extension number is currently "12" (steps S308-S310), and the operations on the unit 2 are invalidated. Then the display thereon is returned to the state shown in FIG. 12B (Step S311).

In case the extension number entered in the step S303 is not "12" but for example "13", the central control unit 4 changes, if the extension telephone unit 24 is not busy (step S312), the correspondence between the physical addresses and the area indication information of the extension telephone units 2 and 24 to a state shown in FIG. 18B (step S313). At the same time, a display "CHANGED 13" shown in FIG. 12G is given on the unit 2 (step S314), while a display "CHANGED 11" shown in FIG. 12B is given on the unit 24 (step S315).

Thus the extension telephone unit 2 assumes the extension number "13" and functions according to the data originally assigned for the extension telephone unit 24, while the extension telephone unit 24 assumes the extension number "11" and functions according to the data originally assigned for the extension telephone unit 1. The unit 1, assuming the extension number "12", functions according to the data originally assigned to the unit 2. If the extension telephone unit 24 is busy in the step S312, the sequence proceeds to the step S316 as explained above, thereby invalidating the preceding operations.

Also in the step S303, entry of an extension number other than "12" may be treated as invalid, in order to avoid confusion resulting from double changes.

The telephone exchange apparatus 3 of the present embodiment has so-called message function of providing a display shown in FIG. 18A on the extension telephone unit 24 by predetermined operations on the extension telephone unit 1, in case of no response from or busy state of the unit 24 when it is called from the unit 1. This displaying may be performed when a specific operation is made by the extension telephone unit 24 when an ordinary operation is made by the extension telephone unit 24.

When a message is sent from the extension telephone unit 1 to the unit 24 to leave a display shown in FIG. 18A on said unit 24, the central control unit 4 searches, in the step S105 in FIG. 10, the area in the memory 5 shown in FIG. 8B, in order to detect whether a message has been left by the extension telephone unit 1 or 2 to the unit 24. When the extension telephone unit 24 gives a display shown in FIG. 18A due to the message left by the extension telephone unit 1, the central control unit 4 varies the display on said extension 24 to the state shown in FIG. 18B, whereby a call can be made from the extension 24 to the extension number "12" for calling the person who left the message. Same applies when change of message is requested from the extension telephone unit 2.

Thus, in the switching of the area indication information corresponding to a certain physical address, if the extension number corresponding to the switched area indication information is to be informed to other extensions, the central control unit 4 varies the setting in such a manner that the extension number corresponding to the area indication information after switching is informed to other extensions.

On the other hand, the extension telephone units may include various types such as a unit for hand-free speech and a unit capable of call generation and reception during power breakage. These types are stored, together with the physical addresses, in the memory 5 when the extension telephone units are connected. If the extension telephone unit 2 is different in type from the unit 1, or if the extension telephone unit 1 or 2 is a master unit (unit for setting the system data) so that the transfer of its function to another unit may cause confusion, the operation in the step S103 in FIG. 10 may be invalidated and said invalidation may be displayed on the extension telephone unit 1.

Also the data of which interchange may cause confusion may be excluded from the interchange.

Although the present invention has been explained by preferred embodiments, it is not limited by such embodiments and is subject to various modifications within the scope and spirit of the appended claims.

What is claimed is:

1. A telephone exchange apparatus for exchanging first and second extension telephone units, comprising:
   memory means for storing first and second information; and
   reading means for reading, in a first mode, the first information from said memory means based on a predetermined operation by the first extension telephone unit and the second information from said memory means based on a predetermined operation by the second extension telephone unit,
   wherein said reading means is adapted, in a second mode, to read the second information from said memory means based on the predetermined operation by the first extension telephone unit and the first information from said memory means, based on the predetermined operation by the second extension telephone unit, and
   wherein the first and second modes are switched based on an operation by one of the first and second extension telephone units.

2. A telephone exchange apparatus according to claim 1, wherein said reading means is adapted to read the first information in the first mode or the second information in the second mode, when a predetermined key is depressed in the first extension telephone unit.

3. A telephone exchange apparatus for exchanging a plurality of extension telephone units including first and second extension telephone units, comprising:
   memory means for storing first information corresponding to the first extension telephone unit and second information corresponding to the second extension telephone unit; and
   control means for controlling said memory means, in response to a request from one of the plurality of extension telephone units, in such a manner that the first extension telephone unit corresponds to the second information and the second extension telephone unit corresponds to the first information.

4. A telephone exchange apparatus according to claim 3, wherein the first and second information include one-touch dialling data or abbreviated dialling data and redialling data.

5. A telephone exchange apparatus according to claim 3, wherein the first and second information include information assigned to function buttons.

6. A telephone exchange apparatus according to to claim 3, wherein the first and second information include telephone charge information.

7. A telephone exchange apparatus according to claim 3, wherein the first and second information include information for restricting call generation.

8. An apparatus according to claim 3, wherein a request to renew is generated from the first or the second extension telephone unit.

9. A telephone exchange apparatus for first and second extension telephone units, comprising:
   memory means for storing first and second information; and
   renewing means for renewing, in a first mode, the first information in said memory means based on an operation by the first extension telephone unit and the second information in said memory means based on an operation by the second extension telephone unit,
   wherein said renewing means is adapted, in a second mode, to renew the second information in said memory means based on the operation by the first extension telephone unit.

10. An apparatus according to claim 9, wherein said renewing means is adapted to renew the first information in the first mode or the second information in the second mode, when a predetermined key is depressed in the first extension telephone unit.

11. An apparatus according to claim 9, wherein said renewing means effects switching from the first mode to the second mode, in response to a switching instruction from the first extension telephone unit.

12. An apparatus according to claim 9, wherein said renewing means is adapted, in the second mode, to renew the first information in said memory means, based on the predetermined operation by the second extension telephone unit.

13. An apparatus according to claim 9, wherein said renewing means renews the first and second information on a speech charge.

14. A telephone exchange apparatus for exchanging a plurality of extension telephone units including first and second extension telephone units, comprising:
   memory means for storing first information corresponding to the first extension telephone unit; and
   control means for controlling said memory means such that the first information corresponds to the second extension telephone unit in accordance with an instruction from one of the plurality of extension telephone units,
   wherein said control means controls the second extension telephone unit so as to display second information, and
   the second information is displayed on the first extension telephone unit when the instruction is generated from the one of the plurality of extension telephone units.

15. An apparatus according to claim 14, wherein the instruction is generated from the second extension telephone unit.

16. An apparatus according to claim 14, wherein the second information includes a message from one of the plurality of extension telephone sets.

17. An apparatus according to claim 14, wherein the first information includes telephone numbers.

18. A method for renewing information stored in a memory provided in a telephone exchange apparatus, comprising the steps of:

renewing, in a first mode, first information stored in the memory on the basis of an operation at a first extension telephone set;

renewing, in the first mode, second information stored in the memory on the basis of an operation at a second extension telephone set; and renewing, in a second mode, the second information stored in the memory on the basis of the operation at the first extension telephone set.

19. A method according to claim 18, further comprising the step of switching the first mode and the second mode.

20. A method according to claim 18, further comprising the step of switching the first mode and the second mode on the basis of a predetermined key operation at the first extension telephone set.

21. A method according to claim 18, further comprising the step of switching the first mode and the second mode on the basis of a predetermined key operation at the second extension telephone set.

22. A method according to claim 18, wherein the first and second information relates to charges for speech.

* * * * *

UNITED STATES PATENT AND TRADEMARK OFFICE
CERTIFICATE OF CORRECTION

PATENT NO. : 5,392,340

DATED : February 21, 1995

INVENTOR(S) : KUNIAKI OTSUKA

Page 1 of 2

It is certified that error appears in the above-identified patent and that said Letters Patent is hereby corrected as shown below:

ON THE TITLE PAGE item [57] Abstract, line 4, "units" should read --units,--.

COLUMN 3

Line 41, "call," should read --calls,--.

COLUMN 4

Line 56, "With" should read --When--.

COLUMN 7

Line 17, "onetouch" should read --one-touch--.
Line 29, "and and" should read --and--.

UNITED STATES PATENT AND TRADEMARK OFFICE
CERTIFICATE OF CORRECTION

PATENT NO. : 5,392,340

DATED : February 21, 1995

INVENTOR(S) : KUNIAKI OTSUKA

It is certified that error appears in the above-identified patent and that said Letters Patent is hereby corrected as shown below:

COLUMN 8

Line 67, "original" should read --originally--.

COLUMN 12

Line 11, "to to" should read --to--.

Signed and Sealed this

Twelfth Day of September, 1995

Attest:

BRUCE LEHMAN

Attesting Officer

Commissioner of Patents and Trademarks